(12) United States Patent
Chang

(10) Patent No.: US 7,796,345 B2
(45) Date of Patent: Sep. 14, 2010

(54) ZOOM LENS SYSTEM

(75) Inventor: Yu-min Chang, Taipei (CN)

(73) Assignee: Asia Optical Co., Inc., Taichung (TW)

( * ) Notice: Subject to any disclaimer, the term of this patent is extended or adjusted under 35 U.S.C. 154(b) by 1 day.

(21) Appl. No.: 12/430,245

(22) Filed: Apr. 27, 2009

(65) Prior Publication Data
US 2009/0284842 A1    Nov. 19, 2009

(30) Foreign Application Priority Data
May 14, 2008    (TW) ............................. 97117742 A

(51) Int. Cl.
G02B 15/14    (2006.01)
(52) U.S. Cl. .................. 359/684; 359/685; 359/676
(58) Field of Classification Search ............. 348/240.3, 348/340; 359/676, 684, 685, 687
See application file for complete search history.

(56) References Cited

U.S. PATENT DOCUMENTS 6,721,105 B2 *    4/2004    Ohtake et al. ............... 359/676
7,092,169 B1 *    8/2006    Chang ........................ 359/683
7,158,313 B2 *    1/2007    Chang ........................ 359/676
2009/0273848 A1 *    11/2009    Chang ........................ 359/687

* cited by examiner

Primary Examiner—David N Spector

(57) ABSTRACT

A zoom lens system includes, in order from an object side to an image side, first to fifth lens group respectively having positive, negative, positive, positive, and positive refractive power. When zooming from a wide-angle end to a telephoto end, the first, third and fourth lens groups move to the object side and the second lens group moves to the image side, whereby a spacing between the first and second lens groups and a spacing between the fourth and fifth lens groups are both increased and a spacing between the second and third lens groups is decreased. The following condition is satisfied:

$$0 < \left| \frac{MG2 \cdot Y}{f2} \right| \le 0.05$$

where MG2 represents the movement range of the second lens group when zooming from the wide-angle end to the telephoto end, Y represents a maximum diagonal length of the image plane, and f2 represents the focal length of the second lens group.

14 Claims, 12 Drawing Sheets

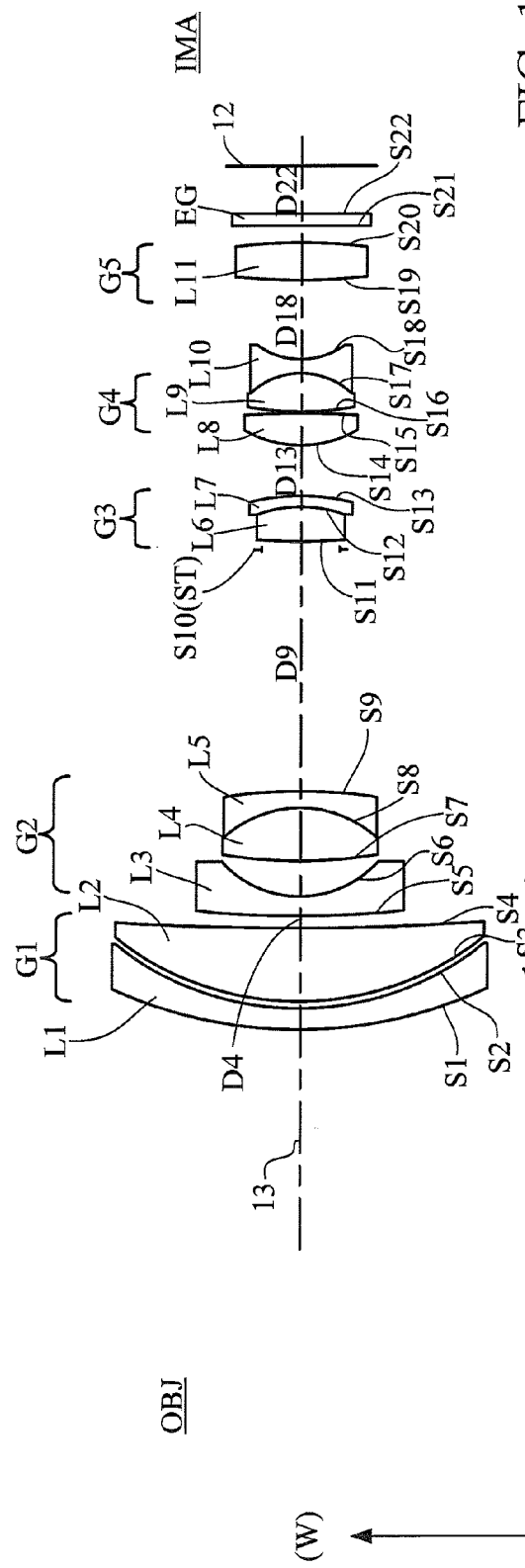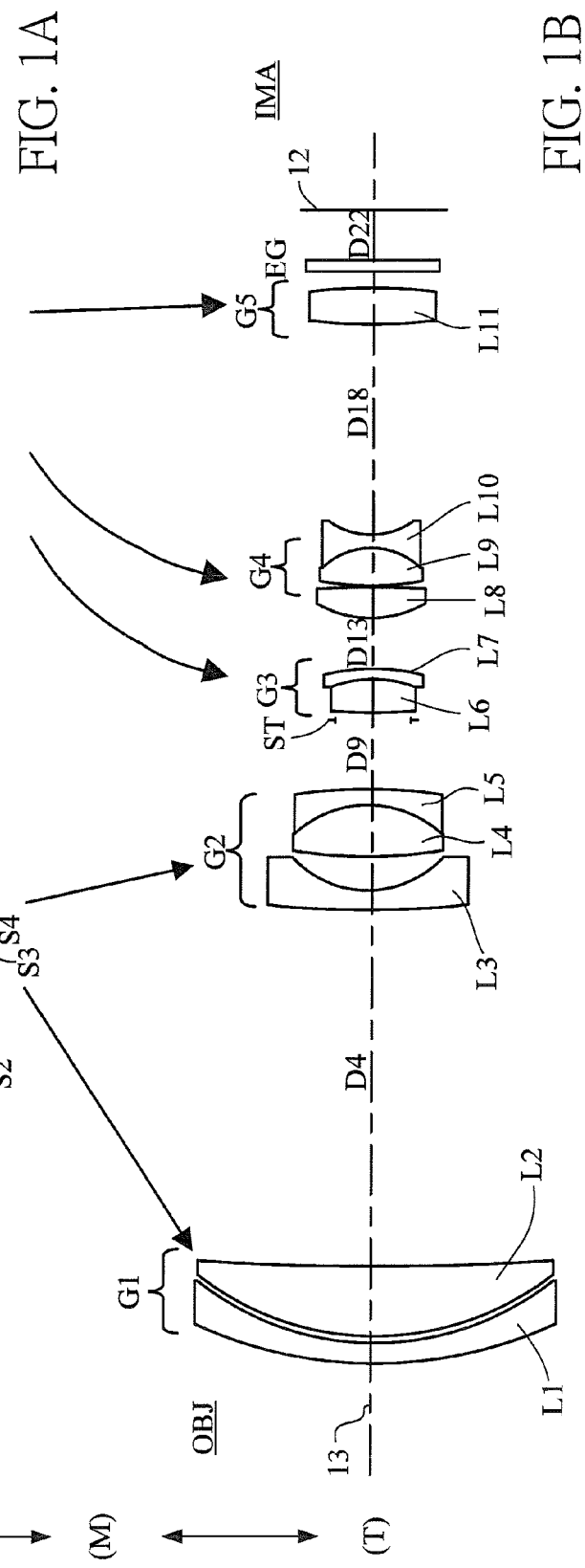

ZOOM LENS SYSTEM

BACKGROUND OF THE INVENTION

Claim of Priority

This application claims priority to Taiwanese Patent Application No. 097117742 filed on May 14, 2008.

1. Field of the Invention

The present invention relates to a zoom lens system, and particularly to a compact zoom lens system with a short overall length and a high image resolution for forming a real image on a digital or non-digital image pickup device of a camera.

2. Description of Prior Art

In recent years, with the rapid integration of optical technology into digital electronic technology, most electronic devices such as camera mobile phones, small digital cameras and small video cameras have been integrated with a zoom lens system for effecting the photographic function. Such a zoom lens system is generally required to be small in size and light in weight for portability, while being capable of providing a high zoom ratio and a high image resolution. Generally, a high zoom ratio lens system consists of a plurality of lens groups and a considerable number of constituent lenses, whereby the overall length of the lens system is rather long. To meet the additional high-resolution requirement, special low dispersion lenses and aspheric lenses are further included in the lens system.

With the development of semiconductor technology, aspheric lenses have been widely used in a photographic lens system. The adoption of an aspheric lens effectively corrects spherical aberration associated with spherical lenses. Further, an aspheric lens functions equivalent to several spherical lenses, whereby the cost can be reduced and a compact lens system can be ensured. For a zoom lens system, in order to obtain the desired zoom ratio and optical performance within the entire zoom range while ensuring a compact configuration, the lens configuration for each lens group of the zoom lens system must be carefully designed. Conventionally, a photographic zoom lens system generally employs three lens groups in a negative-positive-positive refractive power configuration, wherein two of the three lens groups are movable for realizing zooming. However, the movement ranges of the two movable lens groups are relatively large, and the imaging performance dramatically varies with the increase of zoom ratio. To overcome these disadvantages, a zoom lens system consisting of four lens groups and thus an increased number of constituent lenses has been introduced. Three of the four lens groups are generally configured to be movable for realizing zooming. However, in order to achieve a high zoom ratio of 5× and a high image resolution, a long overall length of such a zoom lens system is necessitated for allowing movement of the three lens groups. When all the four lens groups are configured to be movable, both the number of constituent lenses and the manufacturing cost of the zoom lens system are generally increased. Further, whether three or four lens groups are configured to be movable for effecting zooming, the outer diameter of each lens group of the conventional four-group zoom lens system is generally large. This results in a large retraction space and a large retraction length when the conventional four-group zoom lens system is retracted.

It is known in the zoom lens art that, to reduce the overall length of a zoom lens system, a direct and efficient solution is to reduce the movement range of each lens group during zooming. Unfortunately, this solution generally requires an increase in the manufacturing precision and difficulty of the zoom lens system and a reliable aberration correction effect is also difficult to be ensured. Therefore, how to simplify the lens configuration so as to reduce the size and weight of the whole zoom lens system while maintaining high optical performance including a high zoom ratio and a high image resolution is a difficult problem encountered by a zoom lens designer.

Hence, an improved four-group zoom lens system, which is compact in size and short in retraction length while providing a high zoom ratio and a high image resolution, is desired to overcome the above problems encountered in the prior art.

SUMMARY OF THE INVENTION

The object of the present invention is to provide a zoom lens system consisting of five lens groups in a positive-negative-positive-positive-positive refractive power configuration to provide a high zoom ratio and a high image resolution, the zoom lens system also being short in the overall length and small in size.

To achieve the above object, the present invention provides a zoom lens system including, in order from an object side to an image side along an optical axis thereof, a first lens group having positive refractive power, a second lens group having negative refractive power, a third lens group having positive refractive power, a fourth lens group having positive refractive power and a fifth lens group having positive refractive power. When zooming from a wide-angle end to a telephoto end, the first, third and fourth lens groups move to the object side and the second lens group moves to the image side. The zoom lens system of the present invention satisfies the following condition:

$$0 < \left| \frac{MG2 \cdot Y}{f2} \right| \leq 0.05$$

where MG2 represents the movement range of the second lens group when zooming from the wide-angle end to the telephoto end, Y represents a maximum diagonal length of the image plane, and f2 represents the focal length of the second lens group.

The fifth lens group moves to effect the focusing operation, so that a shift in the image plane due to a variation in magnification during zooming is compensated.

The second lens group has at least one aspheric surface and comprises, in order from the object side to the image side along the optical axis of the zoom lens system, a meniscus concave lens and a cemented lens. The cemented lens is constructed by a biconvex lens cemented with a meniscus concave lens.

The zoom lens system of the present invention also satisfies the following condition:

$$0.40 \leq \frac{MG1 \cdot fw}{fT \cdot Y} \leq 0.93$$

where MG1 represents the movement range of the first lens group when zooming from the wide-angle end to the telephoto end, fw represents the focal length of the zoom lens system at the wide-angle end, fT represents the focal length of the zoom lens system at the telephoto end, and Y represents the maximum diagonal length of the image plane.

The first lens group comprises, in order from the object side to the image side along the optical axis of the zoom lens system, a meniscus concave lens and a meniscus convex lens.

The zoom lens system of the present invention further satisfies the following condition:

$$1.9 \leq \frac{f3 \cdot f4 \cdot fW}{(f3+f4) \cdot fT} \leq 2.95$$

where f3 represents the focal length of the third lens group, f4 represents the focal length of the fourth lens group, fW represents the focal length of the zoom lens system at the wide-angle end and fT represents the focal length of the zoom lens system at the telephoto end.

The third lens group comprises, in order from the object side to the image side along the optical axis of the zoom lens system, a biconvex lens and a meniscus concave lens cemented with each other.

The fourth lens group serves to compensate spherical and coma aberrations. The fourth lens group comprises, in order from the object side to the image side along the optical axis of the zoom lens system, a biconvex lens having at least one aspheric surface and a cemented lens constructed by a biconvex lens cemented with a biconcave lens.

The fifth lens group moves to effect the focusing operation. During focusing, the fifth lens group moves toward the object side to approach the fourth lens group, whereby the spacing between the fourth and fifth lens groups is decreased. This movement of the fifth lens group serves to compensate a shift in the image plane due to a variation in magnification during zooming. The fifth lens group also may serve as a compensating lens group to move together with the third and fourth lens groups during the zooming operation, and then moves independently for effecting the focusing operation. The fifth lens group comprises a biconvex lens.

The zoom lens system of the present invention further includes an aperture stop disposed between the second and third lens groups. The aperture stop moves with the third lens group during zooming.

The zoom lens system of the present invention comprises five lens groups in a positive-negative-positive-positive-positive refractive power configuration. During the zooming operation, the first, third and fourth lens groups move toward the object side, while the second lens group moves toward the image side. The fifth lens group moves to effect the focusing operation. By the employment of four movable lens groups for realizing zooming and the incorporation of aspheric lenses, the zoom lens system of the present invention provides a high zoom ratio of 5× to 6× and a high image resolution. During zooming, the movement range of the second lens group is relatively small. This effectively reduces the outer diameter of the second lens group and thus increases the possibility of obtaining a compact zoom lens system when retracted. The configuration of the zoom lens system of the present invention also helps to reduce the outer diameters of all the second, third and fourth lens groups, whereby the retraction space for receiving the zoom lens system is correspondingly reduced. Thus, a compact zoom lens system is obtained, which is short in retraction length, small in outer diameter and high in zoom ratio (5 to 6 times). Further, the zoom lens system of the present invention consists of only eleven constituent lenses, which results in a short overall length and a reduced manufacturing cost.

BRIEF DESCRIPTION OF THE DRAWINGS

The present invention may be best understood through the following description with reference to the accompanying drawings, in which:

FIGS. 1A and 1B are schematic views respectively illustrating the lens arrangement of the zoom lens system of the present invention at a wide-angle end and a telephoto end, the arrows representing the movement directions of constituent lens groups of the zoom lens system of the present invention when zooming from the wide-angle end to the telephoto end;

DETAILED DESCRIPTION OF THE PREFERRED EMBODIMENTS

Figure 2B:
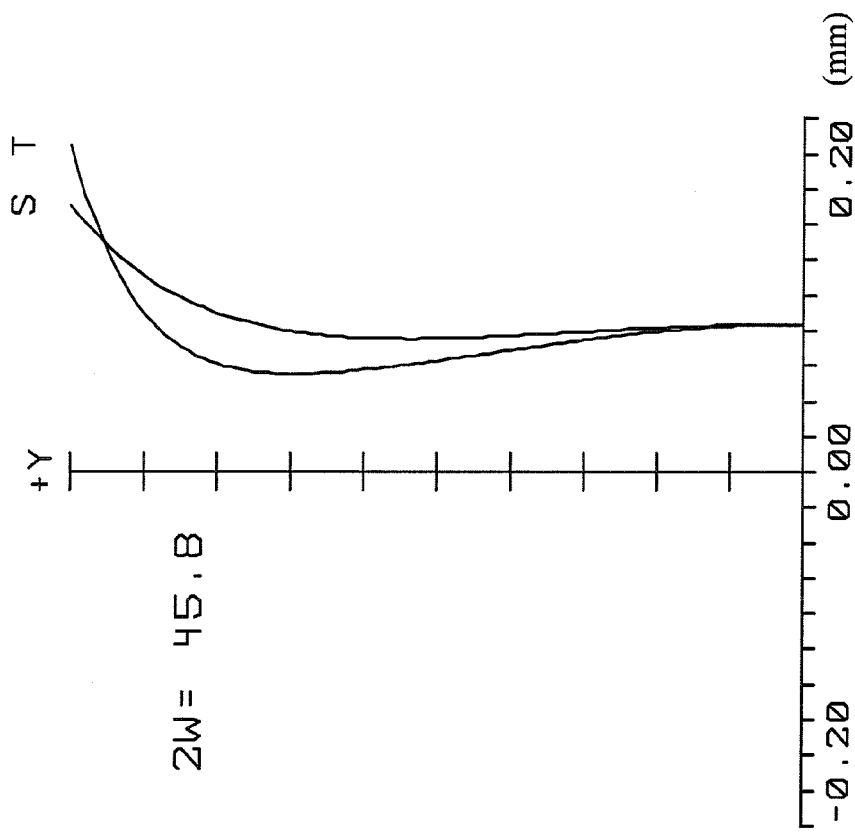
FIGS. 2A-2C are respective graphic representations of field curvature according to a numerical embodiment of the present invention at the wide-angle end, a medium-angle position and the telephoto end.

The above-mentioned and other technical contents, features and effects of the present invention will become apparent from the hereinafter set forth detailed description of preferred numerical embodiments of the present invention in combination with the drawings.

The present invention provides a zoom lens system, which is used in an image pickup device or a photographic device for forming an image of an object onto an image sensor (CCD or CMOS). The lens construction of the zoom lens system in accordance with the present invention is illustrated in FIGS. 1A and 1B, in which reference numeral 13 denotes an optical axis of the zoom lens system, reference numeral 12 denotes an image plane, symbol "OBJ" denotes an object side, symbol "IMA" denotes an image side, symbol "W" denotes a wide-angle end, symbol "M" denotes a medium-angle position, symbol "T" denotes a telephoto end, and symbol "EG" schematically denotes a glass element such as a low-pass filter or a cover glass on the image sensor. FIGS. 1A and 1B respectively show the zoom lens system of the present invention in the "wide-angle end" and the "telephoto end", while the arrows shown on the same drawing sheet between FIGS. 1A and 1B and indicated as the "medium-angle position (M)"

serve to indicate the movement of the constituent lens of the zoom lens from the wide angle end (FIG. 1A) to the telephoto end (FIG. 1B).

As shown in FIGS. 1A and 1B, the zoom lens system of the present invention includes, in order from the object side OBJ to the image side IMA along the optical axis 13 thereof, a first lens group G1 having positive refractive power, a second lens group G2 having negative refractive power, a third lens group G3 having positive refractive power, an aperture stop ST disposed between the second and third lens groups G2, G3, a fourth lens group G4 having positive refractive power, a fifth lens group G5 having positive refractive power, and a glass element EG disposed proximate to the image plane 12.

The first lens group G1 comprises, in order from the object side OBJ to the image side IMA along the optical axis 13, a meniscus concave lens L1 having negative refractive power and a meniscus convex lens L2 having positive refractive power. The second lens group G2 comprises, in order from the object side OBJ to the image side IMA along the optical axis 13, a meniscus concave lens L3 having negative refractive power and a cemented lens. The cemented lens consists of a biconvex lens L4 having positive refractive power and a meniscus concave lens L5 having negative refractive power. The third lens group G3 comprises, in order from the object side OBJ to the image side IMA along the optical axis 13, a biconvex lens L6 and a meniscus concave lens L7 cemented with each other. The fourth lens group G4, which serves to compensate spherical and coma aberrations, comprises, in order from the object side OBJ to the image side IMA along the optical axis 13, a biconvex lens L8 having positive refractive power and a cemented lens. The biconvex lens L8 has at least one aspheric surface, and the cemented lens is constructed by a biconvex lens L9 having positive refractive power cemented with a biconcave lens L10 having negative refractive power. The fifth lens group G5 comprises a biconvex lens L11 having positive refractive power. The above constituent lenses of the zoom lens system of the present invention may be all made of glass. Alternatively, some constituent lenses such as aspheric lenses L3 an L8 may be made of plastics.

When zooming from the wide-angle end (W) to the telephoto end (T), as indicated by the arrows shown between FIGS. 1A and 1B, the first, third and fourth lens groups G1, G3, G4 of the zoom lens system move toward the object side OBJ and the second lens group G2 moves toward the image side IMA, so that the spacing D4 between the first and second lens groups G1, G2 is increased, the spacing D9 between the second and third lens groups G2, G3 is decreased, and the spacing D18 between the fourth and fifth lens groups G4, G5 is increased. During the zooming operation, the aperture stop ST moves together with the third lens group G3.

The fifth lens group G5 moves to effect focusing. During focusing, the fifth lens group G5 moves toward the object side OBJ to approach the fourth lens group G4, whereby the spacing D18 between the fourth and fifth lens groups G4, G5 is decreased. This movement of the fifth lens group G5 serves to compensate a shift in the image plane 12 due to a variation in magnification during zooming. The fifth lens group G5 also may serve as a compensating lens to move together with the third and fourth lens groups G3, G4 during the zooming operation, and then move independently for effecting the focusing operation.

The movement range of the first lens group G1 of the zoom lens system during zooming is represented by MG1 and satisfies the following condition (1):

$$0.40 \leq \frac{MG1 \cdot fw}{fT \cdot Y} \leq 0.93 \quad (1)$$

where MG1 represents the movement range of the first lens group G1 when zooming from the wide-angle end to the telephoto end, fw represents the focal length of the zoom lens system at the wide-angle end, fT represents the focal length of the zoom lens system at the telephoto end, and Y represents a maximum diagonal length of the image plane 12.

The movement range of the second lens group G2 of the zoom lens system during zooming is represented by MG2. This movement range MG2 of the second lens group G2 is relatively small and satisfies the following condition (2):

$$0 < \left| \frac{MG2 \cdot Y}{f2} \right| \leq 0.05 \quad (2)$$

where MG2 represents the movement range of the second lens group G2 when zooming from the wide-angle end to the telephoto end, Y, as mentioned above, represents the maximum diagonal length of the image plane 12, and f2 represents the focal length of the second lens group G2.

The zoom lens system further satisfies the following condition (3):

$$1.9 \leq \frac{f3 \cdot f4 \cdot fW}{(f3 + f4) \cdot fT} \leq 2.95 \quad (3)$$

where f3 represents the focal length of the third lens group G3, f4 represents the focal length of the fourth lens group G4, and fW and fT, as mentioned above, respectively represent the focal length of the zoom lens system at the wide-angle end and the telephoto end.

The zoom lens system of the present invention is constructed by five lens groups G1-G5 consisting of eleven lenses L1-L11. At least two of the eleven lenses L1-L11 are preferably configured to be aspheric lenses to correct aberrations. In a preferred embodiment of the present invention, the two meniscus concave lenses L3 and L5 of the second lens group G2 and the biconvex lens L8 of the fourth lens group G4 are all aspheric lenses having at least one aspheric surface. The aspheric surfaces of these aspheric lenses are expressed by the following formula:

$$DD = \frac{CH^2}{1 + \sqrt{1 - (1+K)C^2H^2}} + E_4H^4 + E_6H^6 + E_8H^8 + E_{10}H^{10} + E_{12}H^{12} + E_{14}H^{14}$$

where DD represents displacement in the direction of the optical axis at the position of height H from the optical axis relative to the surface vertex; C=1/r; r is the curvature radius of the aspheric surface on the optical axis; H represents a height of a point on the aspheric surface with respect to the optical axis; K represents a cone constant; and $E_4$, $E_6$, $E_8$, $E_{10}$, $E_{12}$ and $E_{14}$ are respectively aspheric coefficients for fourth, sixth, eighth, tenth, twelfth and fourteenth order terms.

A numerical embodiment of the zoom lens system in accordance with the present invention will be described in detail hereinafter.

Figure 2A:
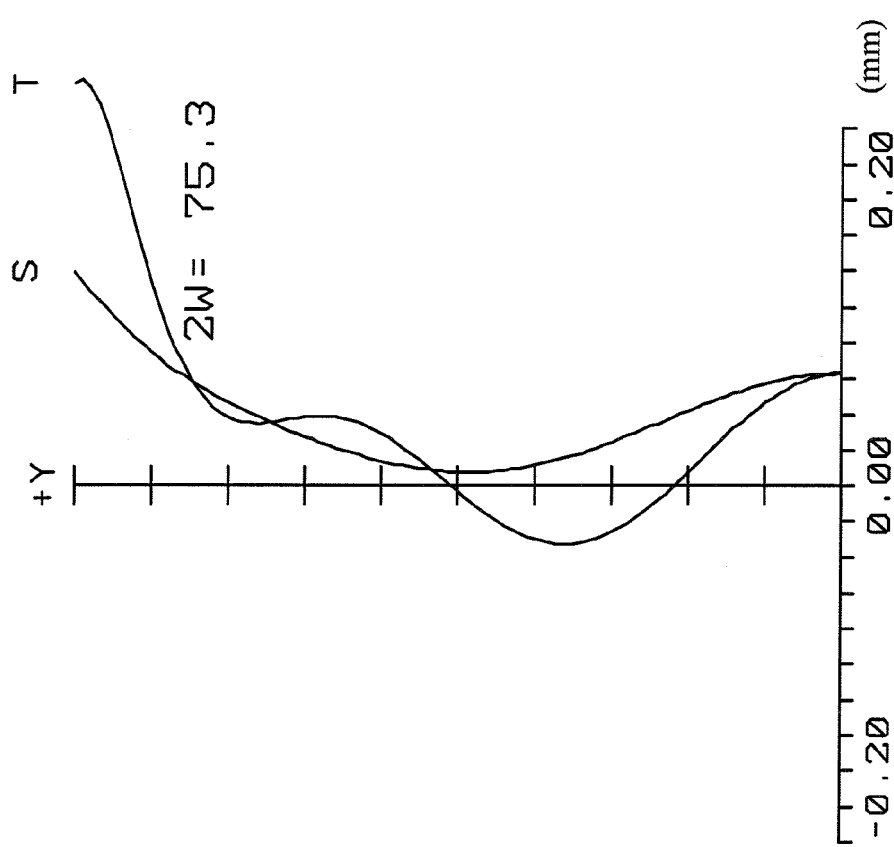
Figure 3A:
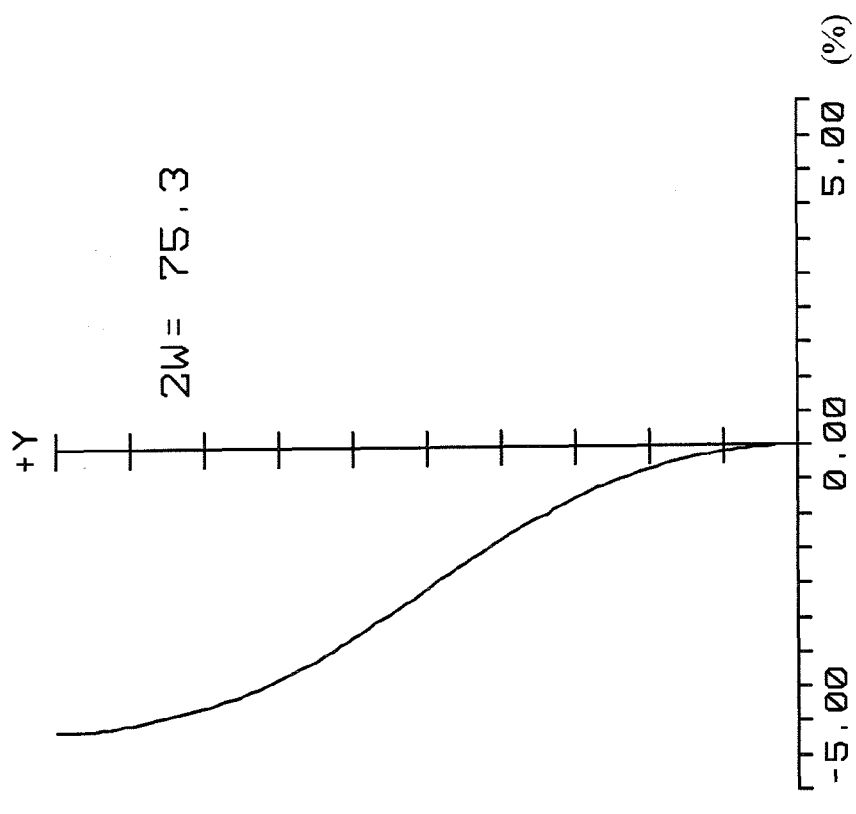
FIGS. 3A-3C are respective graphic representations of distortion aberration according to a numerical embodiment of the present invention at the wide-angle end, the medium-angle position and the telephoto end.
Figure 2C:
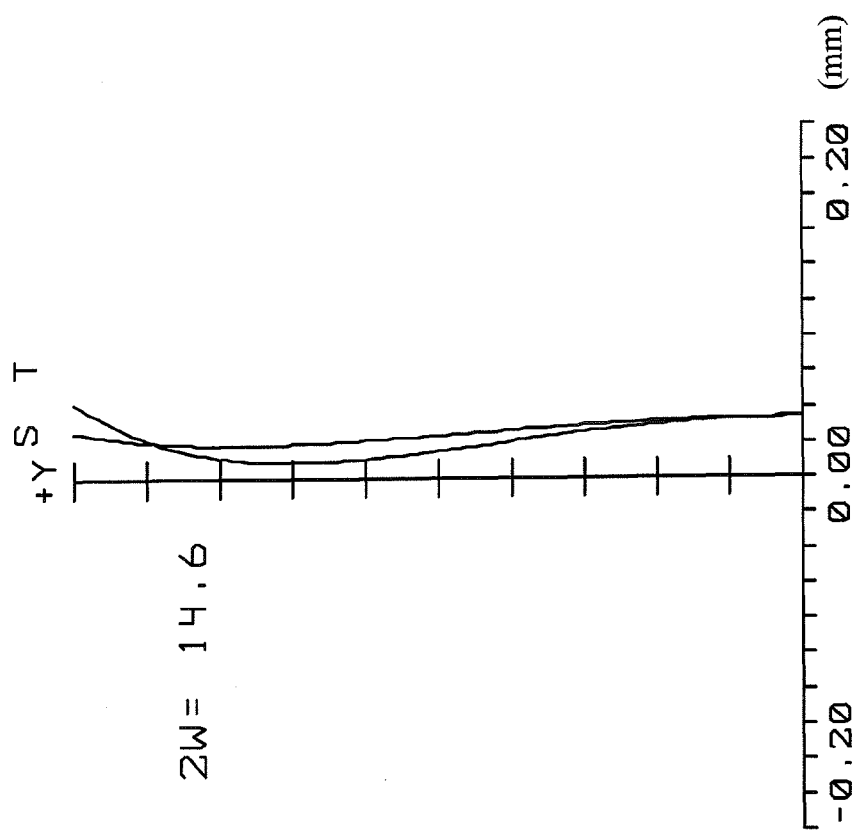
Figure 3C:
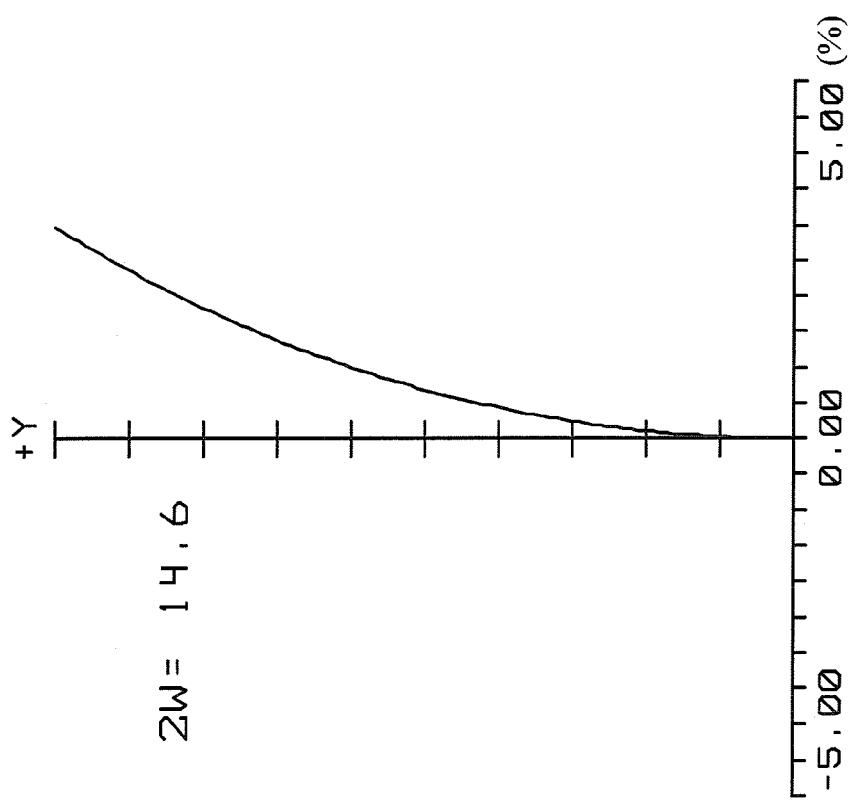
Figure 3B:
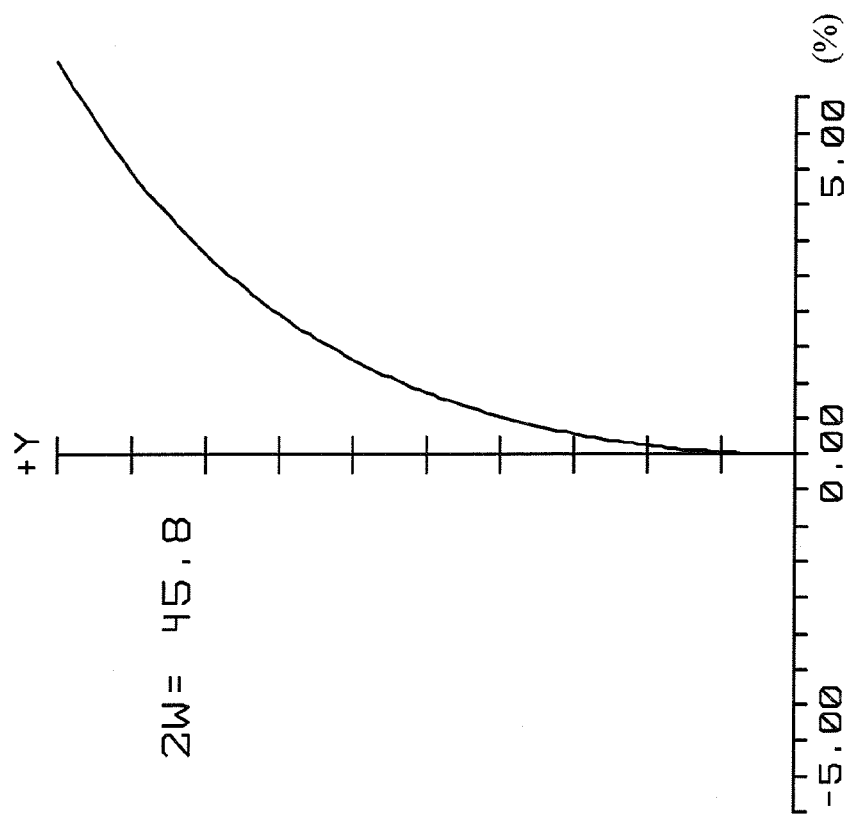
Figure 4B:
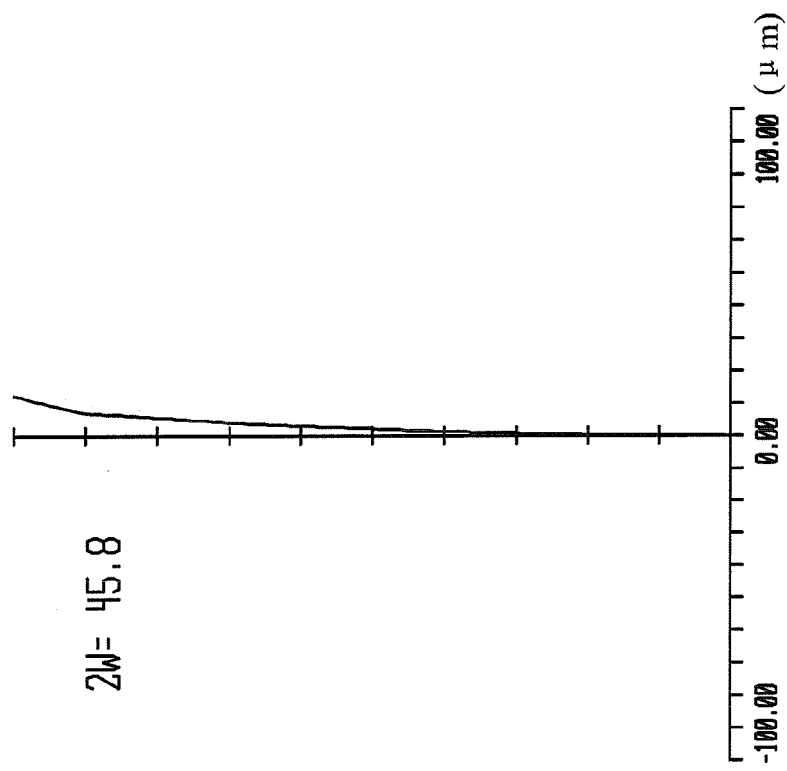
FIGS. 4A-4C are respective graphic representations of lateral color according to a numerical embodiment of the present invention at the wide-angle end, the medium-angle position and the telephoto end.
Figure 4A:
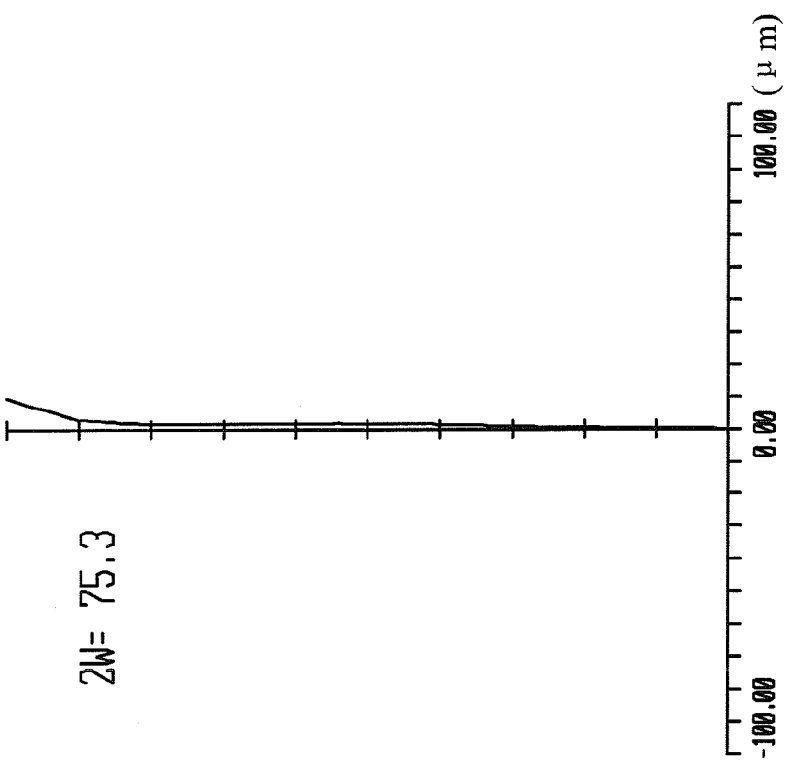
Figures 4C, 5A:
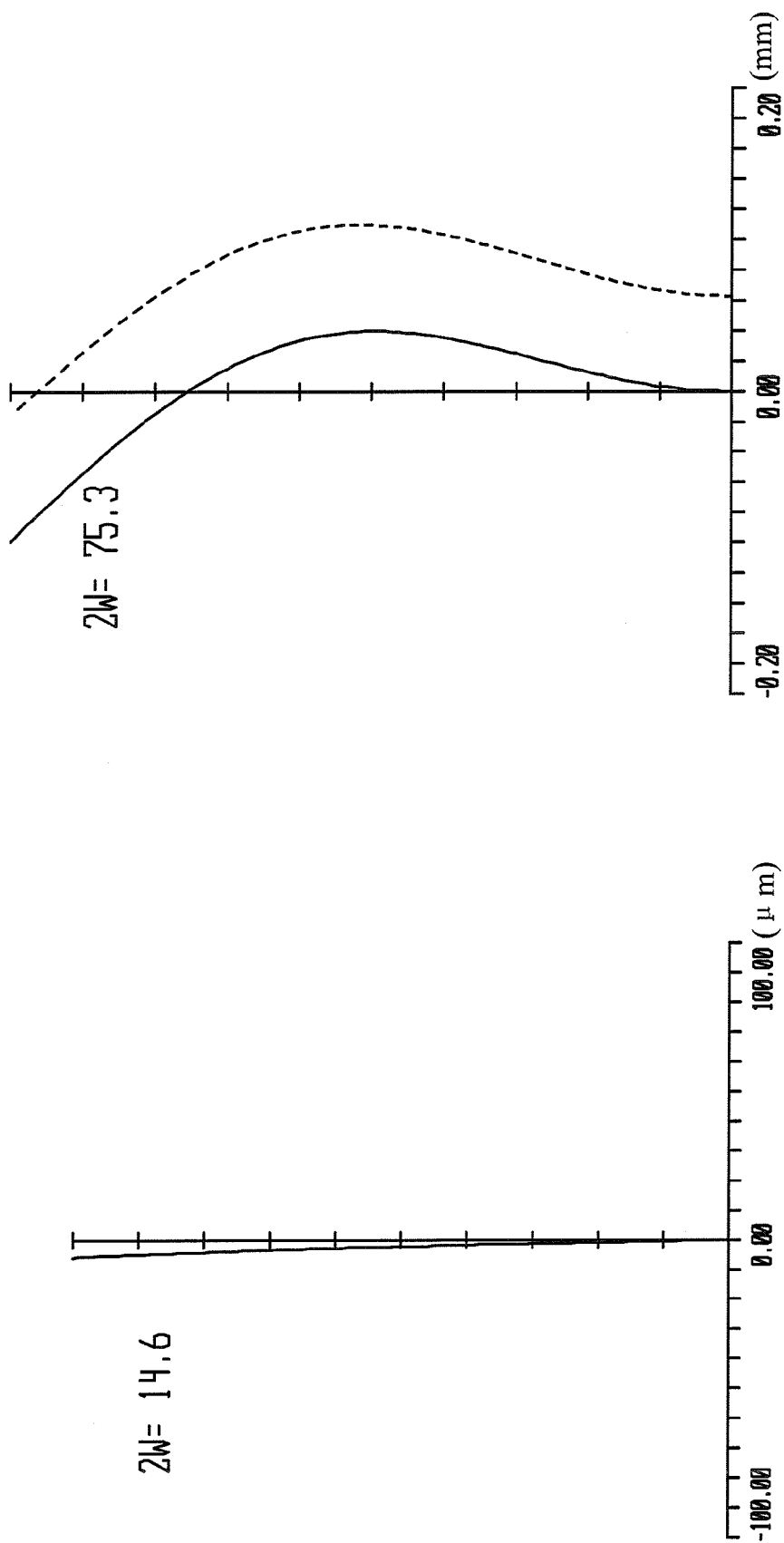
FIGS. 5A-5C are respective graphic representations of longitudinal spherical aberration according to a numerical embodiment of the present invention at the wide-angle position, the medium-angle end and the telephoto end.
Figure 5C:
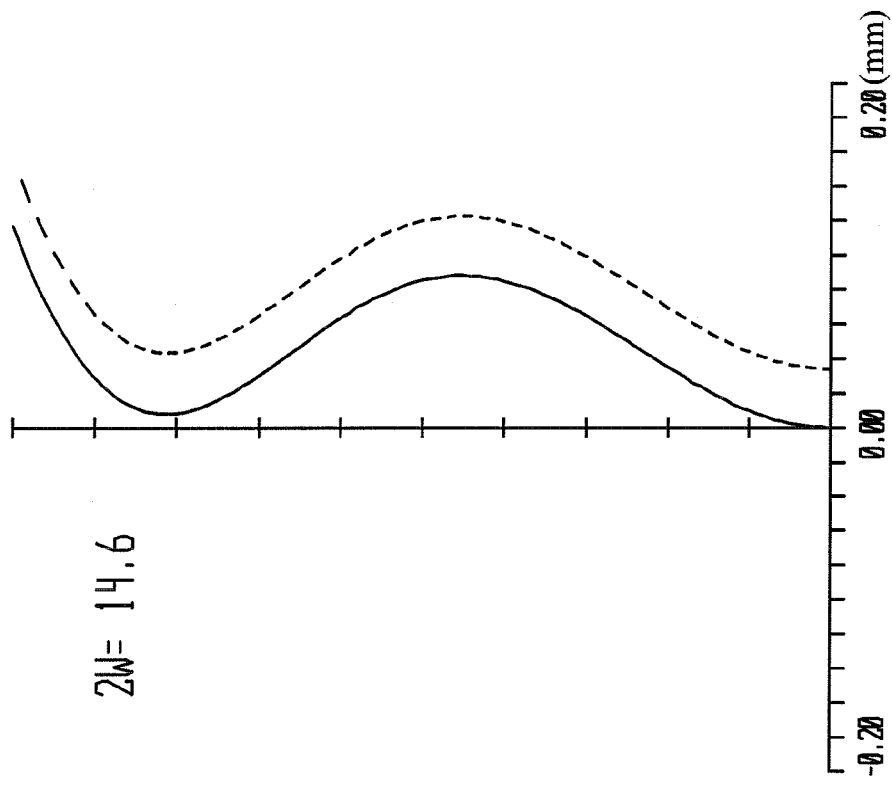
Figure 5B:
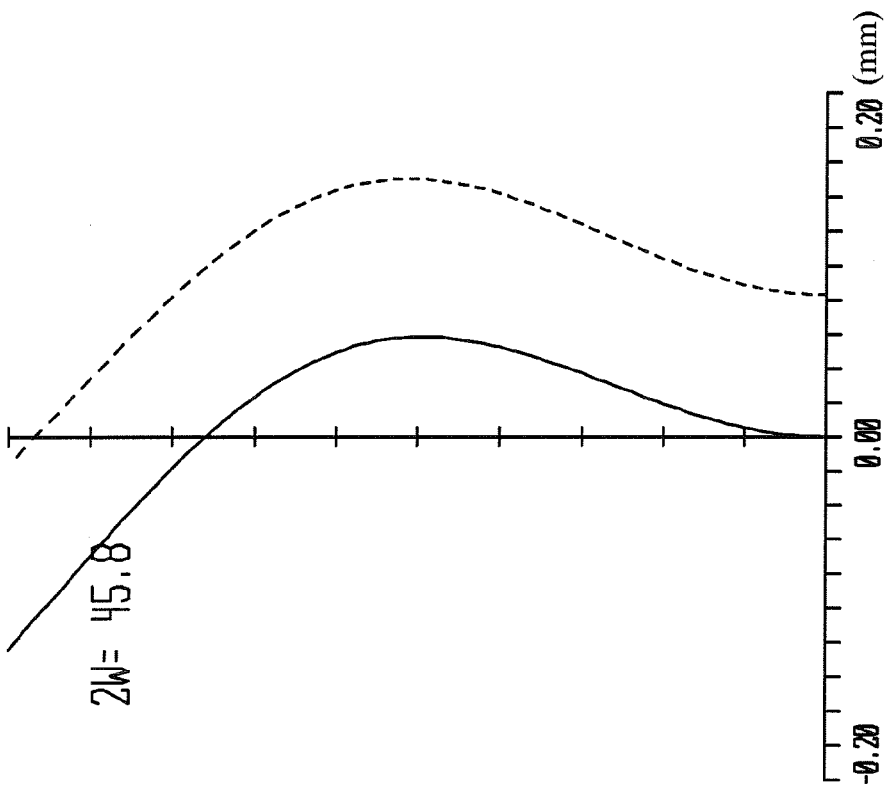
Figure 6A:
FIGS. 6A-6C are respective graphic representations of coma aberration according to a numerical embodiment of the present invention at the wide-angle end.
Figure 6B:
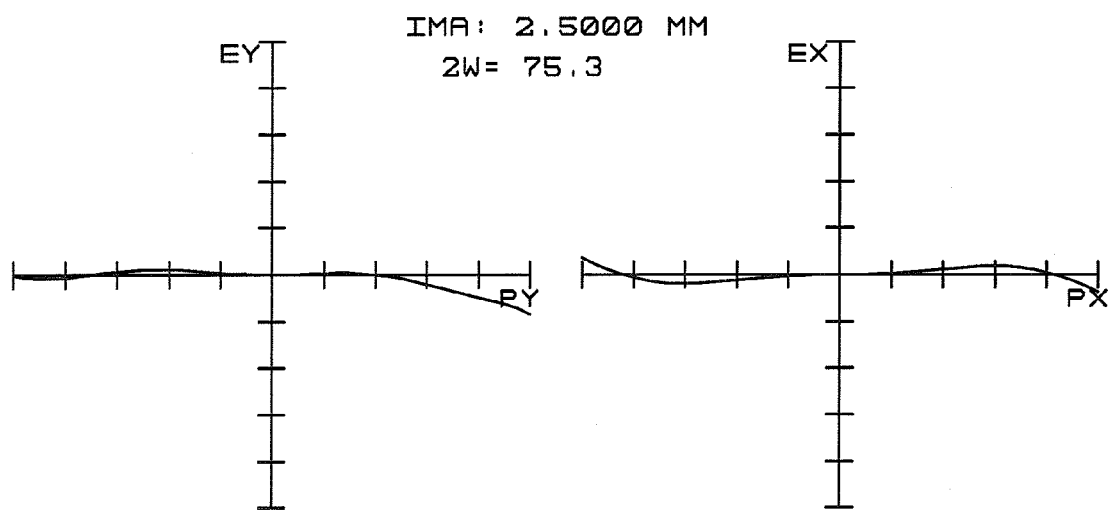
Figure 6C:
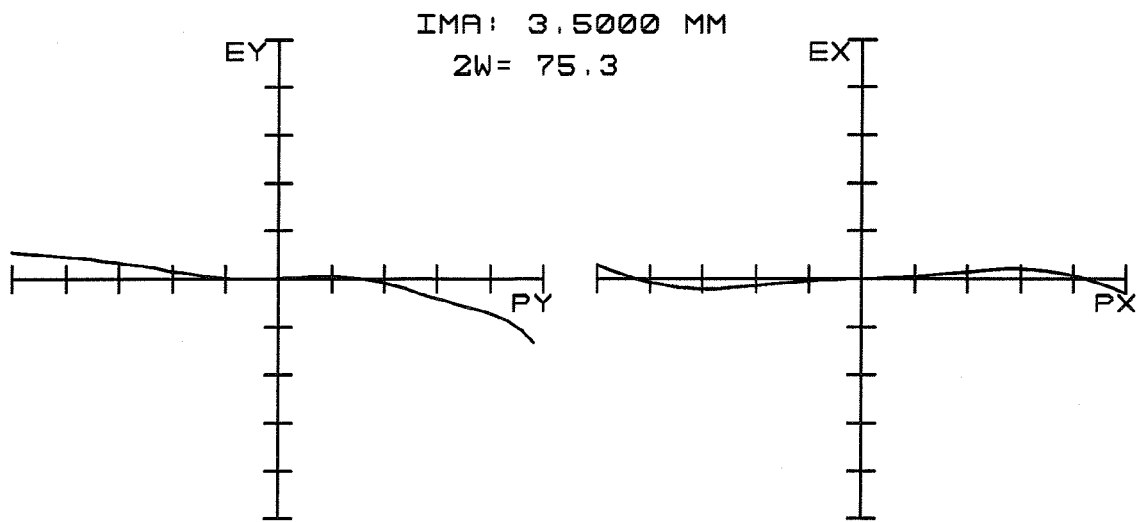
Figure 6D:
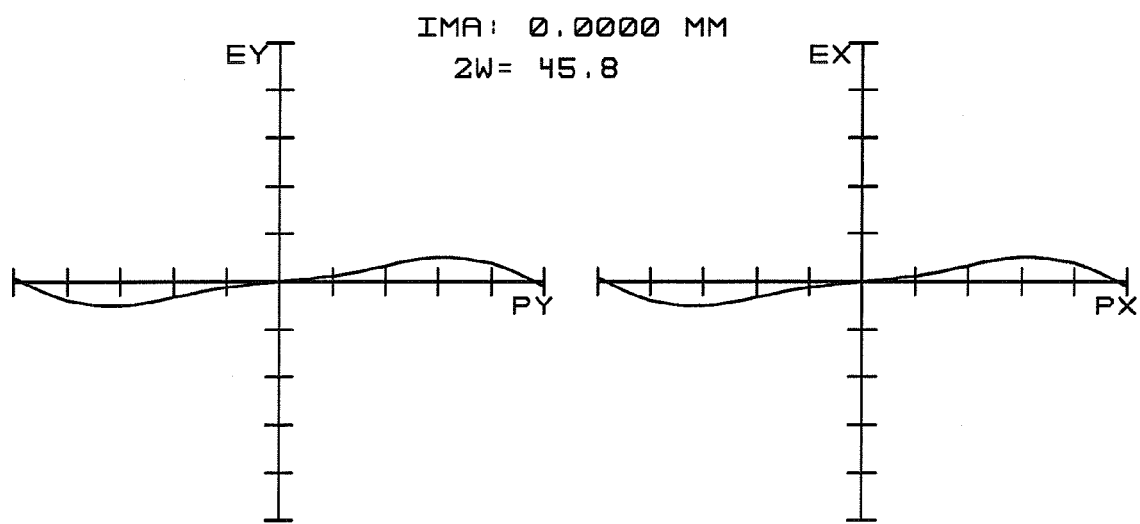
FIGS. 6D-6F are respective graphic representations of coma aberration according to a numerical embodiment of the present invention at the medium-angle position.
Figure 6E:
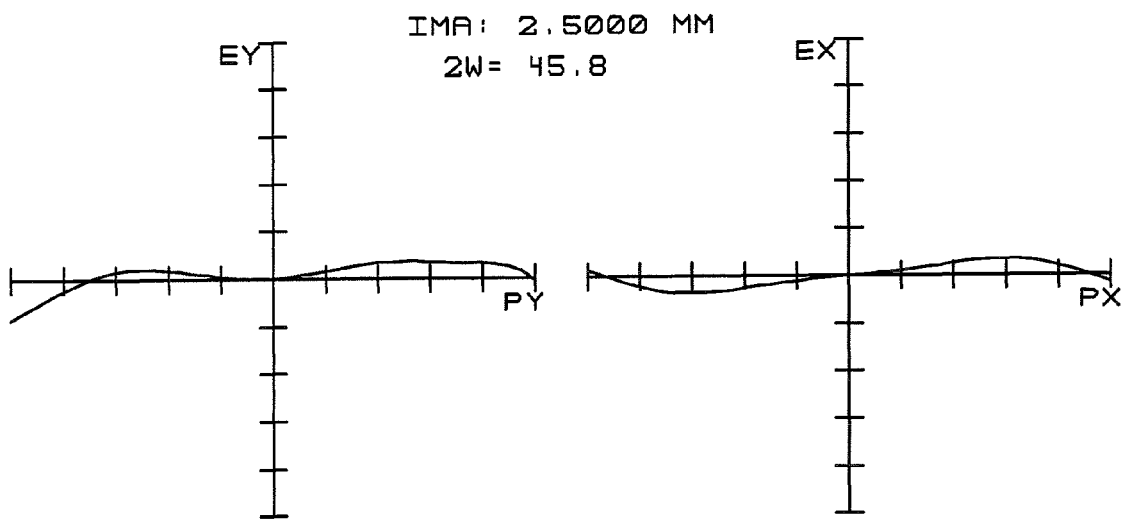
Figure 6F:
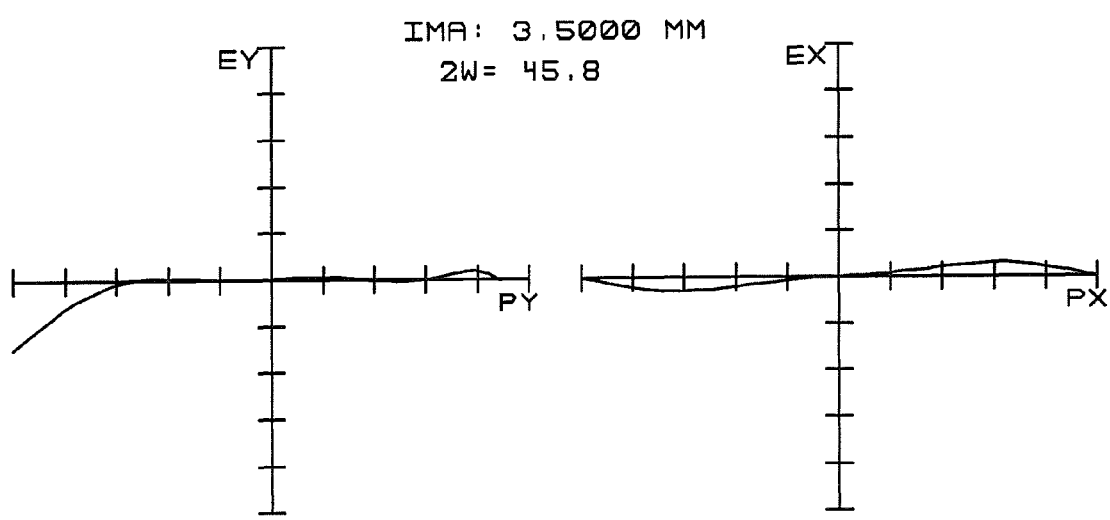
Figure 6G:
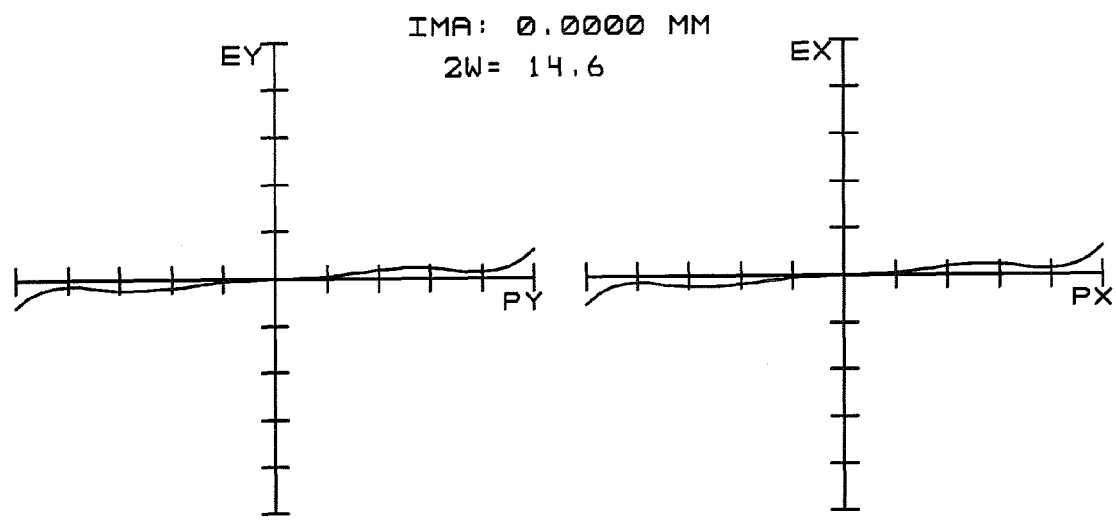
FIGS. 6G-6I are respective graphic representations of coma aberration according to a numerical embodiment of the present invention at the telephoto end.
Figure 6H:
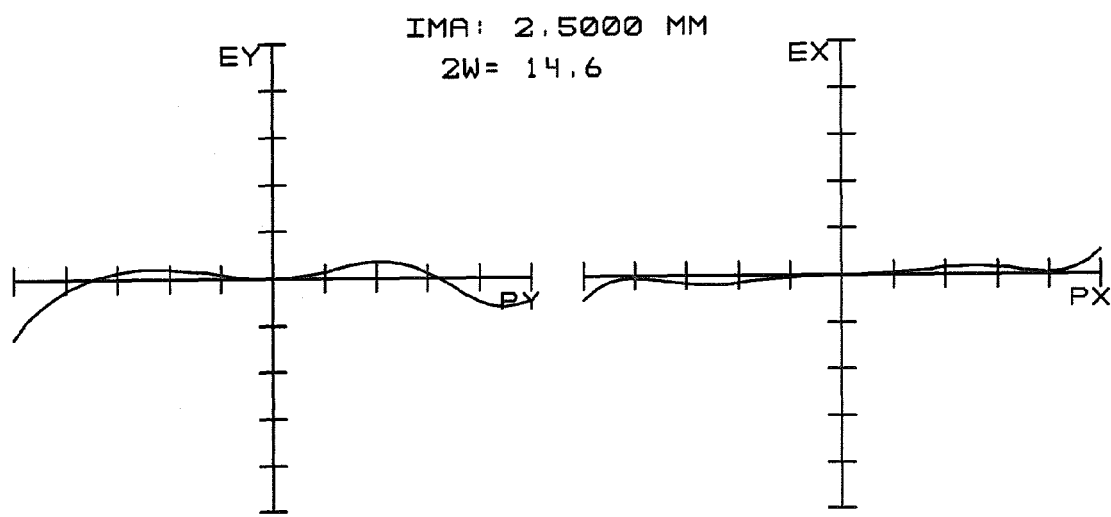
Figure 6I:
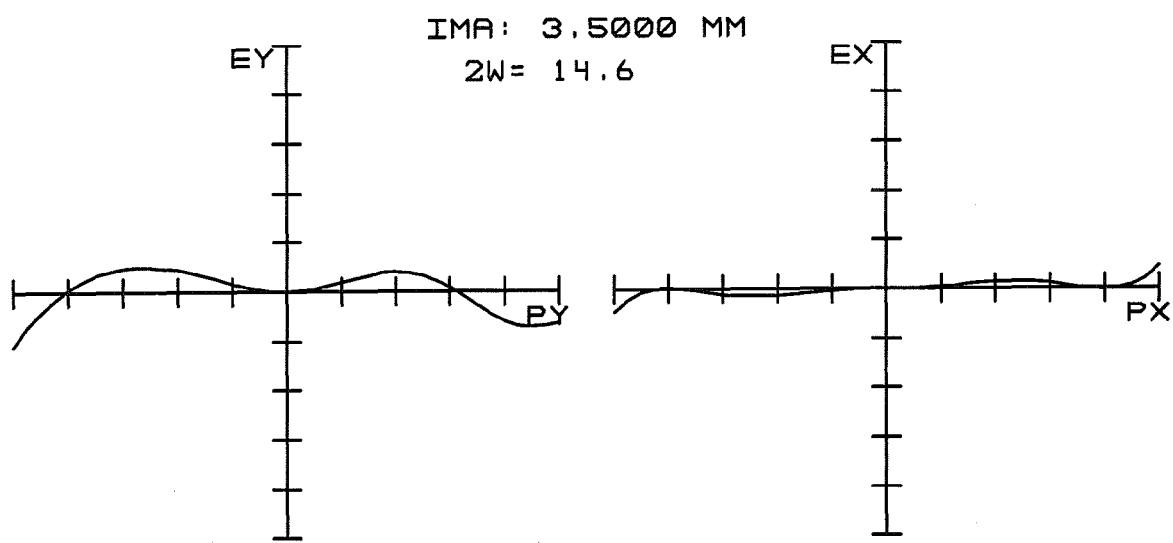

FIGS. 2A-6I illustrate various aberrations generated by the zoom lens system according to a numerical embodiment, wherein FIGS. 2A-2C are respective graphic representations of field curvature at the wide-angle end, the medium-angle position and the telephoto end, FIGS. 3A-3C are respective graphic representations of distortion aberration in the different three zooming positions, FIGS. 4A-4C are respective graphic representations of lateral color in the different three zooming positions, FIGS. 5A-5C are respective graphic representations of longitudinal spherical aberration in the different three zooming positions, and FIGS. 6A-6I are respective graphic representations of coma aberration or transverse ray fan plots in the different three zooming positions. It can be seen from these graphs that the zoom lens system of the present invention provides excellent correction of various aberrations and thus a high level of optical performance.

Numerical values of the constituent lenses of the zoom lens system according to the numerical embodiment are shown in Data Table 1 given below. In Data Table 1, "i" represents the order of the surface from the object side OBJ (including lens surfaces, the aperture stop ST and the glass element EG), "Ri" represents the radius of curvature (mm) of the ith surface, "D" represents the ith member thickness (wherein the ith member is defined as the physical element associated with the ith surface) or the distance (mm) between the ith surface and the (i+1)th surface, and "Nd" and "Vd" respectively represent the refractive index (d-line) and Abbe number (d-line) of the ith member.

DATA TABLE 1

| Surface (i) | Ri (mm) | D (mm) | Nd | Vd |
| --- | --- | --- | --- | --- |
| S1 | 28.6919 | 1.35 | 1.900000 | 18.00 |
| S2 | 18.9424 | 0.45 | | |
| S3 | 19.0936 | 4.6 | 1.732513 | 37.16 |
| S4 | 175.0000 | D4 | | |
| S5 | 105.8813 | 1.24 | 2.092963 | 38.11 |
| S6 | 6.8000 | 2.224227565 | | |
| S7 | 30.0000 | 3.4 | 1.755199 | 27.51 |
| S8 | −7.3000 | 1.04 | 1.900000 | 51.00 |
| S9 | −44.4134 | D9 | | |
| S10 | ST | 0.5 | | |
| S11 | 34.1525 | 2.2 | 1.516330 | 64.14 |
| S12 | −8.0282 | 0.7 | 1.672787 | 21.94 |
| S13 | −13.4845 | D13 | | |
| S14 | 6.9940 | 2.04 | 1.589130 | 61.14 |
| S15 | −59.4507 | 0.1 | | |
| S16 | 18.5798 | 2.46 | 1.635956 | 29.72 |
| S17 | −4.7640 | 0.9 | 1.688931 | 31.08 |
| S18 | 4.7640 | D18 | | |
| S19 | 34.4523 | 2.4 | 1.589130 | 61.14 |
| S20 | −36.0000 | 1 | | |
| S21 | ∞ | 0.75 | 1.516330 | 64.14 |
| S22 | ∞ | D22 | | |

Data Table 2 given below shows aspheric coefficients for the aspheric surfaces of the zoom lens system according to the numerical embodiment, wherein K represents a cone constant and E4, E6, E8, E10 and E12 are respectively aspheric coefficients for fourth, sixth, eighth, tenth and twelfth order terms. It is shown in Data Table 2 that the zoom lens system according to the numerical embodiment includes three aspheric surfaces. Specifically, with reference to FIGS. 1A and 1B, the object-side surface S5 of the meniscus concave lens L3 of the second lens group G2, the image-side surface S9 of the meniscus concave lens L5 of the second lens group G2, and the object-side surface S14 of the biconvex lens L8 of the fourth lens group G4 are all configured to be aspheric surfaces.

DATA TABLE 2

| | Surface No. | | |
| --- | --- | --- | --- |
| | S5 | S9 | S14 |
| K | 0 | 0 | 0 |
| E4 | 2.816229E−05 | −2.633390E−04 | −2.617037E−04 |
| E6 | 2.473405E−06 | 1.562997E−05 | 2.131674E−05 |
| E8 | −4.197413E−08 | −7.302315E−07 | −1.739349E−06 |
| E10 | −2.529195E−10 | 1.103014E−08 | 6.153657E−08 |
| E12 | 7.495771E−12 | 0.000000E+00 | 0.000000E+00 |

Data Table 3 provided below shows variable spacings D4, D9, D13 and D18 between the five lens groups G1-G5 and the spacing D22 between the glass element EG and the image plane 12 of the zoom lens system at the respective wide-angle end (W), the medium-angle position (M) and the telephoto end (T) according to the numerical embodiment. In Data Table 3, D4 denotes a first variable spacing along the optical axis 13 between the image-side surface S4 of the first lens group G1 and the object-side surface S5 of the second lens group G2, D9 denotes a second variable spacing along the optical axis 13 between the image-side surface S9 of the second lens group G2 and the aperture stop S10 (ST) proximate to the third lens group G3, D13 denotes a third variable spacing along the optical axis 13 between the image-side surface S13 of the third lens group G3 and the object-side surface S14 of the fourth lens group G4, D18 denotes a fourth variable spacing along the optical axis 13 between the image-side surface S18 of the fourth lens group G4 and the object-side surface S19 of the fifth lens group G5, D22 denotes a fifth variable spacing along the optical axis 13 between the image-side surface S22 of the glass element EG and the image plane 12, and Y denotes a maximum diagonal length of the image plane 12. In addition, the focal lengths f of the zoom lens system according to the numerical embodiment at the respective wide-angle end (W), the medium-angle end (M) and the telephoto end (T) are also provided in Data Table 3.

DATA TABLE 3

| Y = 5.0 mm | D4 | D9 | D13 | D18 | D22 |
| --- | --- | --- | --- | --- | --- |
| W(f = 6.48) | 0.8 | 15.47310372 | 3.237277157 | 5.010096232 | 3.13813 |
| M(f = 11.84) | 8 | 9.59163694 | 5.464695129 | 9.076600149 | 2.64266 |
| T(f = 38.88) | 20.84176541 | 1.79163694 | 1.558560572 | 20.4127491 | 3.04617 |

Various parameters and their values of the zoom lens system according to the numerical embodiment are listed in the following Data Table 4, wherein fW denotes the focal length of the zoom lens system of the numerical embodiment at the wide-angle end, fT denotes the focal length of the zoom lens system of the numerical embodiment at the telephoto end, f1 denotes the focal length of the first lens group G1, f2 denotes the focal length of the second lens group G2, f3 denotes the focal length of the third lens group G3, f4 denotes the focal length of the fourth lens group G4, f5 denotes the focal length of the fifth lens group G5, MG1 denotes the movement range of the first lens group G1 when zooming from the wide-angle end to the telephoto end, MG2 denotes the movement range of the second lens group G2 when zooming from the wide-angle end to the telephoto end, and Y represents a maximum diagonal length of the image plane 12. It can be obtained from Data Table 4 that, for this numerical embodiment of the present invention, the values for the above conditions (1), (2) and (3) are respectively 0.667, 0.034 and 2.436, all of which fall within the respective required ranges.

DATA TABLE 4

| fW | fT | f1 | f2 | f3 | f4 | f5 | MG1 | MG2 | Y |
|---|---|---|---|---|---|---|---|---|---|
| 6.48 | 38.88 | 53.1 | −8.8 | 22.3 | 42.4 | 30.3 | 20.01 | 0.06 | 5.0 |

As described above, the zoom lens system of the present invention is a five-group zoom lens system having a positive-negative-positive-positive-positive optical configuration. During the zooming operation, the first, third and fourth lens groups G1, G3, G4 move toward the object side OBJ, and the second lens group G2 moves toward the image side IMA. The fifth lens group G5 moves to effect the focusing operation. By the employment of four movable lens groups for realizing zooming and the incorporation of aspheric lenses, the zoom lens system of the present invention provides a high zoom ratio of 5× to 6× and a high image resolution. During zooming, the movement range of the second lens group G2 is relatively small. This effectively reduces the outer diameter of the second lens group G2 and thus increases the possibility of obtaining a compact zoom lens system when retracted. The configuration of the zoom lens system of the present invention also helps to reduce the outer diameters of all the second, third and fourth lens groups G2, G3, G4, whereby the retraction space for receiving the zoom lens system of the present invention is correspondingly reduced. Thus, a compact zoom lens system is obtained, which is short in retraction length, small in outer diameter and high in zoom ratio (5 to 6 times). Further, the zoom lens system of the present invention comprises only eleven constituent lenses, which results in a short overall length and a reduced manufacturing cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens system, in order from an object side to an image side along an optical axis thereof, comprising:
a first lens group having positive refractive power;
a second lens group having negative refractive power;
a third lens group having positive refractive power;
a fourth lens group having positive refractive power; and
a fifth lens group having positive refractive power;
wherein, during zooming from a wide-angle end to a telephoto end, the first lens groups moves toward the object side and the second lens groups moves toward the image side to increase a spacing between the first and second lens groups and to decrease a spacing between the second and third lens groups; and wherein the zoom lens system satisfies the following condition:

$$0 < \left| \frac{MG2 \cdot Y}{f2} \right| \leq 0.05$$

where MG2 represents movement range of the second lens group when zooming from the wide-angle end to the telephoto end, Y represents a maximum diagonal length of an image plane and f2 represents focal length of the second lens group.

2. The zoom lens system as claimed in claim 1, wherein the first lens group comprises, in order from the object side to the image side along the optical axis, a meniscus concave lens and a meniscus convex lens.

3. The zoom lens system as claimed in claim 1, wherein the zoom lens system satisfies the following condition:

$$0.40 \leq \frac{MG1 \cdot fw}{fT \cdot Y} \leq 0.93$$

where MG1 represents movement range of the first lens group when zooming from the wide-angle end to the telephoto end, fw represents focal length of the zoom lens system at the wide-angle end, fT represents focal length of the zoom lens system at the telephoto end, and Y represents the maximum diagonal length of the image plane.

4. The zoom lens system as claimed in claim 1, wherein the third lens group moves toward the object side during zooming and comprises, in order from the object side to the image side along the optical axis, a biconvex lens and a meniscus concave lens cemented with each other.

5. The zoom lens system as claimed in claim 1, wherein the zoom lens system satisfies the following condition:

$$1.9 \leq \frac{f3 \cdot f4 \cdot fW}{(f3 + f4) \cdot fT} \leq 2.95$$

where f3 represents focal length of the third lens group, f4 represents focal length of the fourth lens group, fW represents focal length of the zoom lens system at the wide-angle end and fT represents focal length of the zoom lens system at the telephoto end.

6. The zoom lens system as claimed in claim 1 further comprising an aperture stop disposed between the second and third lens groups, the aperture stop moving with the third lens group during zooming.

7. The zoom lens system as claimed in claim 1, wherein the second lens group comprises, in order from the object side to the image side along the optical axis, a meniscus concave lens and a cemented lens, the cemented lens being constructed by a biconvex lens cemented with a meniscus concave lens.

8. The zoom lens system as claimed in claim 7, wherein the second lens group comprises at least one aspheric lens.

9. The zoom lens system as claimed in claim 8, wherein both the two meniscus concave lenses of the second lens group are aspheric lenses.

10. The zoom lens system as claimed in claim 1, wherein the fourth lens group is a compensating lens group and moves toward the object side during zooming, the fourth lens group consisting of, in order from the object side to the image side along the optical axis, a biconvex lens and a cemented lens.

11. The zoom lens system as claimed in claim 10, wherein the biconvex lens of the fourth lens group is an aspheric lens, and the cemented lens of the fourth lens group is constructed by a biconvex lens cemented with a biconcave lens.

12. The zoom lens system as claimed in claim 1, wherein the fifth lens group moves toward the object side to approach the fourth lens group for focusing, whereby the spacing between the fourth and fifth lens groups is decreased.

13. The zoom lens system as claimed in claim 12, wherein the fifth lens group also serves as a compensating lens group to move together with the third and fourth lens groups for zooming, and then moves independently for focusing.

14. The zoom lens system as claimed in claim 12, wherein the fifth lens group comprises a biconvex lens.

* * * * *